(12) United States Patent
Singh et al.

(10) Patent No.: US 12,399,978 B2
(45) Date of Patent: Aug. 26, 2025

(54) APPARATUS AND METHOD TO MONITOR AND PREVENT MALICIOUS ANCHORING IN A SPATIAL COMPUTING ENVIRONMENT

(71) Applicant: Bank of America Corporation, Charlotte, NC (US)

(72) Inventors: Shailendra Singh, Maharashtra (IN); Maneesh Sethia, Telangana (IN); Abhijit Behera, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 142 days.

(21) Appl. No.: 18/401,640

(22) Filed: Jan. 1, 2024

(65) Prior Publication Data
US 2025/0217474 A1 Jul. 3, 2025

(51) Int. Cl.
| | |
|---|---|
| *G06F 15/16* | (2006.01) |
| *G06F 9/54* | (2006.01) |
| *G06F 21/52* | (2013.01) |
| *G06T 19/00* | (2011.01) |
| *H04L 29/06* | (2006.01) |

(52) U.S. Cl.
CPC .......... *G06F 21/52* (2013.01); *G06T 19/006* (2013.01)

(58) Field of Classification Search
CPC .............................. G06F 21/52; G06T 19/006
USPC ........................................................ 709/245
See application file for complete search history.

(56) References Cited

U.S. PATENT DOCUMENTS

| | | | |
|---|---|---|---|
| 11,922,560 B2 * | 3/2024 | Emami | G01C 21/3632 |
| 2004/0212630 A1 * | 10/2004 | Hobgood | G06T 19/006 |
| | | | 345/633 |
| 2017/0236320 A1 * | 8/2017 | Gribetz | G06F 3/011 |
| | | | 345/419 |
| 2017/0345167 A1 * | 11/2017 | Ard | G06T 19/006 |
| 2020/0273235 A1 * | 8/2020 | Emami | G06T 7/50 |
| 2020/0279239 A1 * | 9/2020 | Ramamurthy | G06Q 20/206 |

(Continued)

OTHER PUBLICATIONS

Google Search: "Spatial Anchor-Spatial Telemetry Data Set," https://www.google.com/search?q=Spatial+Anchor&source=lmns&bib=652&biw=1422&rlzICIGCEA_enUS1033US1033&hl=en&sa=X&ved=2ahUKEwiC5d-k3quAAxVImmMGHadnCbU00pQJKAB6BAgBEAI, Retrieved on Aug. 4, 2023.

(Continued)

*Primary Examiner* — Hamza N Algibhah
(74) *Attorney, Agent, or Firm* — Weiss & Arons LLP

(57) ABSTRACT

Provided herein is a spatial computing system. The system may include a spatial computing apparatus configured to receive an anchoring instruction and consequently anchor a virtual object to a physical object; an onboarding module configured to interface with an existing spatial computing software platform; a spatial telemetry extraction module configured to extract positioning metadata associated with the physical object; a spatial analyzer module configured to detect an anomaly in the anchoring instruction, wherein the anomaly may indicate a suspected attempt to glean personal information from an image of the physical object; an anchor validation module configured to monitor changes in anchoring instructions; a session management module configured to terminate a spatial computing session, upon receiving an indication of an anomaly; a spatial security rule orchestration module configured to block implementation of the anchoring instruction; and a deep learning module.

20 Claims, 4 Drawing Sheets

(56) References Cited

U.S. PATENT DOCUMENTS

| | | | | |
|---|---|---|---|---|
| 2021/0124816 | A1* | 4/2021 | Ebner | G06F 21/35 |
| 2022/0141082 | A1* | 5/2022 | Brun | G06T 7/001 |
| | | | | 709/223 |
| 2022/0189127 | A1* | 6/2022 | Matsuo | G09G 5/38 |
| 2023/0020547 | A1* | 1/2023 | Katkoori | G06F 21/556 |
| 2023/0092874 | A1* | 3/2023 | Krivoruchko | G06F 3/012 |
| | | | | 715/849 |
| 2023/0100610 | A1* | 3/2023 | Pastrana Vicente | G06F 3/011 |
| | | | | 715/727 |
| 2023/0326147 | A1* | 10/2023 | Jouet | G06T 7/11 |
| | | | | 345/419 |
| 2024/0119680 | A1* | 4/2024 | Gunnarsson | G06F 3/0346 |
| 2024/0185541 | A1* | 6/2024 | Cyman, Jr. | G06F 3/1256 |
| 2024/0420429 | A1* | 12/2024 | Alleaume | G06T 19/006 |
| 2024/0428250 | A1* | 12/2024 | Derin | G06T 19/006 |

OTHER PUBLICATIONS

Gusmao et al., "Development and Validation of LiDAR Sensor Simulators Based on Parallel Raycasting," www.mdpi.com/journal/sensors, 2020.

Nissen et al., "Towards Preventing Gaps in Health Care Systems Through Smartphone Use: Analysis of ARKit for Accurate Measurement of Facial Distances in Different Angles," https://www.mdpi.com/1424-8220/23/9/4486, May 5, 2023.

"Apple Vision Pro," https:/www.apple.com/apple-vision-pro/, Retrieved on Aug. 4, 2024.

* cited by examiner

APPARATUS AND METHOD TO MONITOR AND PREVENT MALICIOUS ANCHORING IN A SPATIAL COMPUTING ENVIRONMENT

FIELD OF TECHNOLOGY

Aspects of the disclosure relate to spatial computing. Specifically, this disclosure relates to anchoring of objects in a spatial computing environment.

BACKGROUND

Spatial computing technologies may overlay digital content onto the physical world, while allowing users to stay present and remain connected with their physical surroundings. These technologies have the potential to serve as a client interface with a variety of online services.

Spatial computing systems may enable a user to anchor a virtual object to their physical environment. The term "anchoring" may refer to fixing the location of the virtual object within a room. For example, in an office, a virtual calendar may be fixed to the far right corner of a desk, relative to the entrance doorway. The virtual object may be associated with a hyperlink, such that user activation of the virtual object may enable interaction with a website of interest, using the spatial computing apparatus.

Spatial computing may panoramically survey a user's environment, as part of the process of providing a 3D map of the user's surroundings. Images of various objects in the surroundings may be uploaded onto the computing system or a server that enables the system to run.

SUMMARY

Apparatus and methods for spatial computing are provided herein.

Spatial computer apparatus and systems are entering common use. Such systems may map a user's 3D surroundings. Such systems may also project virtual objects, which may be associated with a hyperlink, onto a visual field of a user and may anchor a virtual object to a physical object.

Hackers could potentially gain access to images of the physical objects captured by a spatial computing apparatus. Such images could contain personal or confidential information. Such images may be accessed in the course of 3D mapping. 3D mapping may be performed by a mapping technology such as light detection and ranging (LiDAR), radar, or neural radiance fields (NeRF). In some embodiments, the technology measures the reflection of a laser or radio signal off objects around a scanner. The reflection may capture a point cloud representing the distance to each point.

Hackers could also alter or corrupt the hyperlinks associated with a virtual object. For example, the hyperlinks could be altered to redirect to a malicious site. The malicious site could contain malware, spyware, or ransomware, which could damage the user's computer network.

A method in accordance with the principles of the described embodiments may be implemented by a computer and/or be automated.

A method in accordance with the principles of the described embodiments may utilize a computer processor and one or more non-transitory computer-readable media storing computer executable instructions. The instructions, when executed by the computer processor, may automatically monitor and analyze anchoring parameters, generate alerts when suspicious parameters are identified, and perform various other activities, as described herein.

In some embodiments, the virtual object displayed on the visual field could be altered by an external or malicious actor to display false or inappropriate information. A described system may be configured to detect when a virtual object display is likely to, or believed to, have been tampered with. In some embodiments, an external or malicious actor may have surreptitiously accessed images from the user's surroundings.

It would be desirable to improve security procedures for spatial computing environments in general and anchoring algorithms in particular.

It would be further desirable to enable monitoring the anchoring layer of a spatial computing apparatus to the protect users against malicious actors.

It would be further desirable to protect users of spatial computing apparatus against accidental redirection to hazardous websites.

Provided herein is a spatial computing system, in accordance with the principles of the described embodiments. The spatial computing system may include a wearable device. The spatial computing system may include a first computer processor. The spatial computing system may include a second computer processor.

In some embodiments of the described systems and methods, the second computer processor is different from the first processor. In some embodiments, the second processor is the same as the first processor.

The wearable device may include a sensing apparatus. The sensing apparatus may be configured to localize physical objects with respect to a fixed landmark. The fixed landmark may be a building, a building wall, or a component thereof. The localized physical objects may include a first physical object and a second physical object. Solely for exemplification, the apparatus may be configured to localize a chair and a desk, with respect to the door of an office. In some embodiments, the physical object or landmark to which a virtual object is anchored may include a table, chair, or wall of a room. The apparatus may include or utilize depth detection technologies, such as LiDAR, radar, and/or other devices for sensing the location and placement of objects.

Reference herein to localization of an object "with respect to" a landmark may indicate that the relative position of the object is indicated. Solely for exemplification, it may be determined that that a desk (the object) is located 1.5 meters away from the door (the landmark) in the direction of the opposite wall.

The sensing apparatus may be configured to capture an image of physical objects. The physical objects may be the mentioned first and second physical objects. The apparatus may include a camera.

The wearable device may include an augmented reality screen. The screen may be configured to project a virtual object onto a visual field of a wearer. The screen may be configured to virtually superimpose a virtual object onto the surroundings of a wearer. The virtual object may be associated with a hyperlink. The hyperlink may activate an online service. The service may be a banking service. The service may be an account management service. The service may be the purchasing of merchandise.

The wearable device may include an interface. The interface may be configured to receive an anchoring instruction from the wearer. In some embodiments, the interface may include a gaze detector. In some embodiments, the gaze detector may enable a user to aim an anchor instruction towards a particular physical location. In some embodiments, the interface may include an actuator mechanism. In some embodiments, the actuator mechanism may include a button, switch, or other pressable input device. In some embodiments, the input device may enable a user to select an object or location that a system component is being aimed towards. In some embodiments, the system components being aimed, in this context, may be a gaze detector.

The anchoring instruction may serve to fix a virtual object (retain the object in a fixed location) relative to a physical object, for example the mentioned first physical object. Solely for exemplification, the anchoring instruction may cause the outer edges of a virtual calendar to align horizontally with the outer edges of a desk, with the bottom surface of the calendar resting on the desktop. In some embodiments, maintenance of a virtual object in a fixed physical relationship to a physical object is referred to herein as "anchoring". In some embodiments, the anchoring is independent of movement of the spatial computing device. In some embodiments, the anchoring is active only when the user is within a defined geofenced area. Solely for exemplification, the geofenced area may be a room or another enclosed area.

An anchoring instruction involving the mentioned first physical object may be referred to herein as the "first anchoring instruction". After the virtual object has been anchored to the first physical object, the virtual object and the first physical object may be referred to herein as the "anchored virtual object" and the "first anchored physical object", respectively.

The first anchoring instruction may be configured to be overridable by a second anchoring instruction. The second anchoring instruction may serve to fix the virtual object relative to the second physical object, after which the second physical object may be referred to herein as the "second anchored physical object".

The mentioned first computer processor may be configured to implement at least one of the first and second anchoring instructions.

The mentioned second computer processor may be configured to monitor the first anchoring instruction. The second processor may be configured to monitor the second anchoring instruction. The second processor may be configured to monitor the hyperlink associated with the anchored virtual object. In some embodiments, reference herein to "monitoring" a hyperlink may include detecting an attempt by an external or malicious actor to subvert the association of a virtual object with its intended hyperlink. In some embodiments, the external actor may attempt to redirect web traffic from the system from an intended hyperlink to a different hyperlink. The second processor may be configured to detect such alteration by an external actor. This processor may be configured to detect alteration of the hyperlink to an unintended hyperlink, which hyperlink may access a malicious website.

In some embodiments, an external or malicious actor may generate a new anchor that was not requested by the user of the spatial computing apparatus. In some embodiments, the new anchor may reference an object that displays confidential information. In some embodiments, the described systems and methods may detect such activity.

The second computer processor may be configured to run a deep learning module or algorithm. The second processor may be configured to communicate with a deep learning module. The second processor may be configured to run computer executable code that includes a deep learning module. In some embodiments, the deep learning module may include a deep neural network. In some embodiments, the deep neural network may include at least three layers of nodes. In some embodiments, the deep neural network may include more than three layers. The deep learning module may train itself to discover patterns associated with abnormal and/or suspicious anchoring instructions, virtual object displays, and/or hyperlinks associated with virtual objects. In some embodiments, the deep learning algorithm may automatically ingest and process unstructured image data. In some embodiments, the algorithm may automatically extract features from image data.

In some embodiments, the nodes in the neural network include an input layer, a plurality of hidden layers, and an output layer. In some embodiments, between 2-10 hidden layers are present. In some embodiments, 2-5, 2-20, or 2-50 hidden layers are present.

In some embodiments, the described input layer functions to receive incoming data, before passing it along to the next-layer (hidden) nodes.

In some embodiments, the hidden layers contain weighted connections between nodes in the layer. In some embodiments, the hidden layers perform non-linear activation functions. In some embodiments, these connections and functions generate the output of the neural network. In some embodiments, the "weight" of a connection refers to the strength of the influence one neuron has on another, which influence may be positive or negative. In some embodiments, the term "activation function" may determine whether or not a neuron will be activated. The activation function may decide whether the neuron's input to the network significantly simplifies a mathematical operation. In some embodiments, the neural networks may be trained by adjusting weighting and testing on different types of outcomes, until an optimized algorithm is achieved.

In some embodiments, the described output layer of the neural network functions to express the optimized, finished data.

In some embodiments, the neural network utilizes backpropagation. The network may use a gradient descent algorithm to calculate errors in predictions and then adjust the weights and biases of the function by moving backwards through the layers in order to train the model. In some embodiments, forward propagation and backpropagation enable the network to make predictions and accordingly correct for errors. In some embodiments, this process iteratively improves the predictions of the algorithm.

The deep learning algorithm may be enabled or configured to detect an anomaly in the first anchoring instruction. The algorithm may be enabled or configured to detect an anomaly in the second instruction. The algorithm may be enabled or configured to detect an anomaly in the hyperlink. In some embodiments, the described anomaly may redirect to a malicious website not intended by the original hyperlink.

The second computer processor may be configured to run an artificial intelligence or machine learning (ML) module or algorithm. In some embodiments, the ML module may direct substantially real-time monitoring of the spatial computing environment and anchoring instructions. This module may contain a timekeeper layer. The timekeeper layer may direct monitoring at fixed time intervals. The intervals may be every 1-10 minutes, every 1-5 minutes, every 1-30 minutes, or every 5-60 minutes. In some embodiments, the ML module may be the same as the deep learning module or algorithm. In other embodiments, the module may be distinct from the deep learning module. In some embodiments, the ML module may be configured to detect movements that are atypical for a particular user. In some embodiments, this module may detect movements that are atypical for users in general.

In some embodiments, the ML module may iteratively improve its modeling of anchor metadata. In some embodiments, the ML module may continually analyze metadata and periodically transmit results from the module's analysis to a central processor. In some embodiments, the central processor may be a deep learning module. In some embodiments, the deep learning module may have any of the characteristics described herein.

In some embodiments, the described ML module may leverage structured, labeled data to make predictions. In some embodiments, the ML module may define features from the input data for the model and organize the data into tables.

The described second computer processor may be configured to transmit an alert to the first computer processor. The alert may be transmitted upon detecting the mentioned anomaly in the first or second anchoring instruction and/or the hyperlink.

In some embodiments of the herein-described methods and systems, when a computer processor receives an alert, the computer processor is configured to block implementation of the second anchoring instruction. In other embodiments, the processor is configured to block implementation of the first anchoring instruction.

In some embodiments of the herein-described methods and systems, when a computer processor receives an alert, the computer processor is configured to disable the hyperlink associated with the virtual object.

In some embodiments of the herein-described methods and systems, when a computer processor receives an alert, the computer processor is configured to block access of a remote server to an image of a physical object. In some embodiments, the physical object is the mentioned first and/or second physical object. The term "remote" may refer to a location not physically connected to the described system.

In some embodiments of the herein-described methods and systems, when a computer processor receives an alert, the processor is configured to alert a user of the apparatus of a suspicious anchoring command. In some embodiments, the three-dimensional coordinates of the anchored physical object may be indicated in a display screen of the apparatus. In some embodiments, the user may be given the option to override the anchoring command. In some embodiments, the user may be given the option to terminate the spatial computing session.

In some embodiments of the herein-described methods and systems, a physical object, for example the first or second physical object, may include confidential information. In some embodiments, the confidential information may include an identification photograph, an identification number, a card number, or an account number. In some embodiments, an object containing confidential information may be identified by scanning the environment of a wearable device. In some embodiments, the wearable device may automatically scan the environment, and a described method or system may monitor information arising from the scan. In some embodiments, the method or system may monitor scanned images to identify suspected confidential information. In some embodiments, the scan may be a panoramic scan. In some embodiments, the confidential information may be private information.

In some embodiments of the herein-described methods and systems, the spatial computing system or computing component thereof may include a spatial telemetry extraction module. In some embodiments, the extraction module may be configured to track the motion or position of a user, or a body part of the user. In some embodiments, this module may be configured to detect movements that are atypical for a particular user. In some embodiments, this module may be configured to detect movements that are atypical for users in general.

In some embodiments, this module may be configured to extract positioning metadata. The metadata may be associated with the anchored physical object. The metadata may be associated with the anchored virtual object. The metadata may be associated with the position of a user of the spatial computing apparatus; or the position of a body part, for example a user's hands or face. The metadata may be associated with the target of a user's gaze. The term "telemetry", as used herein, may refer to spaciotemporal data. In some embodiments, the term "spaciotemporal data" may refer to data cataloguing movements of an object in both space and time, for example, the movement of an apparatus with respect to time.

In some embodiments of the herein-described methods and systems, the spatial computing system or computing component thereof may include a spatial analyzer module. This module may be configured to detect an anomaly in an anchoring instruction. The anchoring instruction may be the first and/or second anchoring instruction. The anomaly may indicate a suspected attempt to glean personal information from an image of the anchored physical object.

In some embodiments of the herein-described methods and systems, the spatial computing system or computing component thereof may include an anchor validation module. In some embodiments, this module may be configured to validate an anchoring instruction (i.e., the first and/or second anchoring instruction) prior to implementing the anchoring instruction (fixing the virtual object relative to the physical object).

In some embodiments, the anchor validation module may be configured to transmit or stream data to a deep learning module. The deep learning module may identify suspicious anchoring instructions. In some embodiments, the deep learning module may have any of the characteristics described herein. In some embodiments, the validation module may be configured to halt an anchoring instruction before anchor deployment. In some embodiments, the validation module may be configured to sense the activities of an external actor. The external actor may be a malicious actor. The activities of the external actor may include accessing confidential information without obtaining permission. In some embodiments, the anchor validation module may be configured to transmit a warning message to the described session management module.

In some embodiments of the herein-described methods and systems, the spatial computing system or computing component thereof may include a session management module. In some embodiments, this module may be configured to terminate a spatial computing session, when warranted. The module may terminate the session upon receiving a warning of a described anomaly. In some embodiments, this module may be configured to monitor logoff and logon commands actuated from anchored virtual objects or icons.

In some embodiments of the herein-described methods and systems, the spatial computing system or computing component thereof may include a spatial security rule orchestration module. In some embodiments, this module may be configured to block implementation of the described anchoring instruction, when warranted.

In some embodiments of the herein-described methods and systems, the spatial computing system or computing component thereof may include a deep learning module. In some embodiments, this module may be configured to detect an anomaly in the positioning metadata. In some embodiments, this module may be configured to detect a suspicious aspect of the anchoring instruction. In some embodiments, this module may be configured to transmit a warning message to the described session management module.

In some embodiments of the herein-described methods and systems, the deep learning module may operate from a cloud server. In some embodiments, a homomorphic encryption layer may mediate between the described spatial computing system and the cloud server. In some embodiments, a homomorphic encryption layer may sit between the spatial computing system and the cloud server. In some embodiments, location and/or anchor metadata may traverse the homomorphic encryption layer. In some embodiments, this layer may filter, mask, or encrypt the data transferred to the deep learning module.

In some embodiments of the herein-described methods and systems, the mentioned spatial computing system or computing component thereof may include a telemetry sensor. In some embodiments, this sensor may be configured to detect the wearer's position; or the position of a wearer's body part. In some embodiments, the body part is selected from the wearer's hands and face.

In some embodiments of the herein-described methods and systems, an event, message, or other content may be represented by a virtual object or an icon. In some embodiments, the virtual object may be configured to be associated with an anchor. In some embodiments, the event, message, or content may be stored on a blockchain-distributed network. The blockchain-distributed network may be a private blockchain. The blockchain-distributed network may protect the event, message, or other content from tampering. The blockchain network may be housed in a described spatial computing system. The blockchain network may be housed externally to the spatial computing system.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
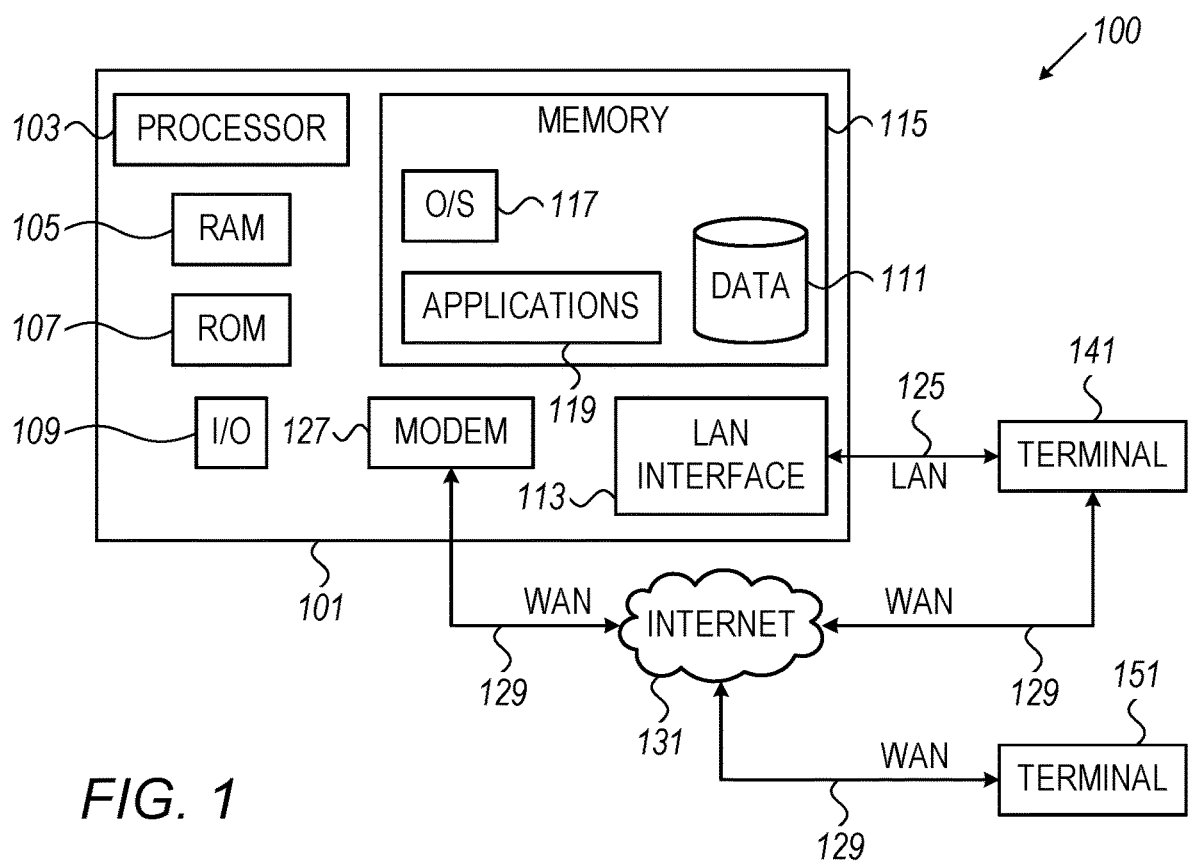
FIG. 1 shows an illustrative system in accordance with the principles of the described embodiments.

Provided herein is a spatial computing system, in accordance with the principles of the described embodiments. The spatial computing system may include a wearable device. The spatial computing system may include a first computer processor. The spatial computing system may include a second computer processor.

The wearable device that is a component of the spatial computing system may include a sensing apparatus. The sensing apparatus may be configured to localize physical objects with respect to a fixed landmark. The localized physical objects may include a first physical object and a second physical object.

The sensing apparatus may be configured to capture an image of physical objects. The physical objects may include the mentioned first and second physical objects. The apparatus may include a camera.

The wearable device may include an augmented reality screen. The screen may be configured to project a virtual object onto a visual field of a wearer or user. The virtual object may be associated with a hyperlink.

The wearable device may include an interface. The interface may be configured to receive an anchoring instruction from the user. The anchoring instruction may serve to fix a virtual object relative to a physical object, for example the mentioned first physical object. Maintenance of a virtual object in any fixed physical relationship to a physical object is referred to herein as "anchoring". In some embodiments, the apparatus may be configured to fix a virtual object at a fixed position within a user's field of view.

An anchoring instruction involving the mentioned first physical object may be referred to herein as the "first anchoring instruction". After the virtual object has been anchored to the first physical object, the virtual object and the first physical object may be referred to herein as the "anchored virtual object" and the "first anchored physical object", respectively.

The first anchoring instruction may be overridable by a second anchoring instruction. The second anchoring instruction may fix the virtual object relative to the second physical object, after which the second physical object may be referred to herein as the "second anchored physical object".

The mentioned first computer processor may be configured to implement at least one of the first and second anchoring instructions.

The mentioned second computer processor may be configured to monitor at least one of the first and second anchoring instructions. The second processor may be configured to monitor the hyperlink associated with the anchored virtual object.

The second computer processor may be configured to run a deep learning algorithm. In some embodiments, the deep learning algorithm may include a deep neural network. In some embodiments, the neural network may include at least three layers of nodes.

In some embodiments, the neural network may be a recurrent neural network (RNN), In some embodiments, the network may be a long short-term memory (LSTM) neural network. The LSTM network may be composed of LSTM units, each including a cell, an input gate, an output gate, and a forget gate. Each cell may store one or more values over a set time interval. The three gates may regulate information flow into and out of the cell. Forget gates may selectively discard information from a previous state by assigning the previous state a value between 0 and 1, compared to the current input. Information having a value closer to 1 is retained, and information with a value closer to 0 is discarded. Input gates may determine which new information units to store in the current state. Input gates may use the same criteria as the forget gates. Output gates may determine which information units in the current state are output. The output gates may assign a value between 0 and 1 to the information, considering the previous and current states. The LSTM network may formulate predictions based on dependencies generated from selectively outputting relevant information from the current state.

The deep learning algorithm may be enabled or configured to detect an anomaly in the first anchoring instruction. The algorithm may be enabled or configured to detect an anomaly in the second instruction. The algorithm may be enabled or configured to detect an anomaly in the hyperlink. In some embodiments, the described anomaly may redirect to a malicious website.

The second computer processor may be configured to transmit an alert to the first processor. The alert may be transmitted upon detection of the mentioned anomaly in the first anchoring instruction, the second anchoring instruction, and/or the hyperlink.

In some embodiments, when the first computer processor receives the alert, the first processor is configured to block implementation of the second anchoring instruction.

In some embodiments, when the first computer processor receives the alert, the first processor is configured to disable the hyperlink associated with the virtual object.

In some embodiments, when the first computer processor receives the alert, the first processor is configured to block access of a remote server to an image of a physical object. In some embodiments, the object is the mentioned first and/or second physical object.

In some embodiments, the mentioned spatial computing system may include a spatial telemetry extraction module. In some embodiments, this module may be configured to extract positioning metadata. The metadata may be associated with an anchored physical object (an object to which a virtual object is anchored). The metadata may be associated with an anchored virtual object.

In some embodiments, the mentioned spatial computing system may include a spatial analyzer module. This module may be configured to detect an anomaly in an anchoring instruction. The anchoring instruction may be the first anchoring instruction. The anchoring instruction may be the second anchoring instruction. The anomaly may signal an attempt to glean personal information from an image of the anchored physical object.

In some embodiments, the mentioned spatial computing system may include an anchor validation module. In some embodiments, this module may be configured to validate an anchoring instruction prior to implementing the anchoring instruction (fixing the virtual object relative to the physical object).

Also provided herein is a system, in accordance with the principles of the described embodiments. The system may be a spatial computing system. The system may include a computer processor and one or more non-transitory computer-readable media storing computer executable instructions. The instructions, when executed by the computer processor, may analyze a hyperlink associated with a virtual object. The system may have any of the aforementioned attributes. The system may include any of the aforementioned components. The system may include a spatial computing apparatus. This apparatus may have, in place of or in addition to the aforementioned components, one or more of, an onboarding module, a spatial telemetry extraction module, a spatial analyzer module, an anchor validation module, a session management module, and a spatial security rule orchestration module.

The system may include a spatial computing apparatus. This apparatus may be configured to receive an anchoring instruction and consequently anchor a virtual object to a physical object.

The described system may include an onboarding module. This module may be a plug-in (adaptor) layer. This module may be configured to function in conjunction with an existing spatial computing software platform.

The described system may include a spatial telemetry extraction module. This module may be configured to extract positioning metadata associated with the physical object. The positioning metadata may be associated with the mentioned virtual object.

The described system may include a spatial analyzer module. This module may be configured to detect an anomaly in the anchoring instruction. The anomaly may indicate a suspected attempt to glean personal information from an image of the mentioned physical object.

The described system may include an anchor validation module. This module may be configured to monitor changes in an anchoring instruction. The change may be in the physical object to which a virtual object is anchored. The change may be in the physical location to which a virtual object is anchored. The validation module may be configured to request a validation decision from the mentioned spatial analyzer module. The validation module may be configured to transmit a validation decision to the mentioned spatial computing apparatus. When validation fails, this module may be configured to transmit an interrupt instruction to the spatial computing apparatus. In response to the interrupt instruction, the spatial computing apparatus may block implementation of a requested anchoring modification. Any of the aforementioned activities may occur prior to fixing the virtual object relative to the physical object.

The described system may include a session management module. This module may be configured to terminate a spatial computing session. This termination step may occur upon receiving an indication of an anomaly.

The described system may include a spatial security rule orchestration module. This module may be configured to block implementation of the mentioned anchoring instruction. This blocking step may occur upon receiving an indication of an anomaly.

In some embodiments, the mentioned spatial computing system may include a deep learning module. In some embodiments, the deep learning module may operate from a cloud server. In some embodiments, the deep learning module may analyze anchor metadata to detect suspicious aspects of an anchor instruction.

In some embodiments, a homomorphic encryption layer may separate the spatial computing system from the cloud server. In some embodiments, the encryption layer may enable analysis of LiDAR metadata and anchor metadata by a service provider, without requiring decryption of the metadata. In some embodiments, the ability to analyze the metadata without performing decryption may protect the privacy of a user of the system.

In some embodiments, the deep learning module may identify suspicious anchoring elements by detecting anchor characteristics significantly departing from the user's historical anchor characteristics. In some embodiments, the deep learning module may identify suspicious anchoring elements by detecting anchor characteristics significantly different from the user's historical preferences.

Also provided herein is a plug-in (onboarding) module for spatial computing security. The module may have any of the characteristics described herein for a spatial computing system. In some embodiments, the module may contain a processor and computer-executable instructions capable of directing the processes described herein. In some embodiments, the module includes the elements or characteristics described herein for a system, but without the spatial computing apparatus hardware.

Also provided herein is a spatial computing system, in accordance with the principles of the described embodiments, wherein the spatial computing system includes a wearable device and a computing component.

In some embodiments, the wearable device includes a sensor. In some embodiments, this module may be configured to localize, with respect to a fixed landmark, a first physical object and a second physical object and capture an image of each of the first and second physical objects.

In some embodiments, the wearable device includes an augmented reality screen. In some embodiments, this module may be configured to project a first virtual object and a second virtual object onto a visual field of a wearer, wherein the first and second virtual objects are each associated with a hyperlink.

In some embodiments, the wearable device includes an input device configured to receive first and second anchoring instructions from the wearer, the anchoring instructions serving to fix the first and second virtual objects relative to the first and second physical objects, respectively. After anchoring, the first and second virtual objects may be referred to herein as the "first and second anchored virtual objects", respectively.

In some embodiments, the described computing component may include a spatial telemetry extraction module. In some embodiments, this module may be configured to extract positioning metadata associated with the first and second anchored virtual objects.

In some embodiments, the described computing component may include a spatial analyzer module. In some embodiments, this module may be configured to detect an anomaly in anchoring instructions. The anomaly may indicate a suspected attempt to glean personal information from the image of a physical object.

In some embodiments, the described computing component may include an anchor validation module. In some embodiments, this module may be configured to validate at least one anchoring instruction prior to fixing a virtual object relative to its respective physical object.

In some embodiments, the described computing component may include a session management module. In some embodiments, this module may be configured to terminate or suspend a spatial computing session. This action may be taken upon receiving an indication of an anomaly.

In some embodiments, the described computing component may include a spatial security rule orchestration module. This module may be configured to perform at least one of the following functions: block or reverse implementation of the anchoring instruction; disable the hyperlink; or block or disable access of a remote server to an image of a physical object.

Also provided herein is a method of protecting confidential information of a user of a spatial computing apparatus, in accordance with the principles of the described embodiments. The method may utilize a computer processor and one or more non-transitory computer-readable media storing computer executable instructions. The instructions, when executed by the computer processor, may automatically monitor and analyze anchoring parameters, generate alerts when suspicious parameters are identified, and perform various other activities, as described herein.

The method may include the step of generating a three-dimensional (3D) model of the surroundings of a wearable device. The device may be worn by a wearer. The wearer may be a user of the spatial computing apparatus.

The mentioned method may include the step of localizing a physical object in the 3D model. The localization may be performed with respect to a fixed landmark.

The method may include the step of capturing an image of the physical object.

The method may include the step of projecting a virtual object onto a visual field, which may be the visual field of the device's wearer. The virtual object may be associated with a hyperlink.

The method may include the step of receiving an anchoring instruction from the wearer. The anchoring instruction may serve to fix the virtual object relative to the physical object.

In some embodiments, the method may include the step of receiving a subsequent anchoring instruction. The subsequent anchoring instruction may override the previous (first) anchoring instruction. The subsequent anchoring instruction may serve to fix the virtual object relative to a second physical object.

The method may include the step of monitoring positioning metadata associated with the virtual object.

The method may include the step of generating an alert. The alert may be generated upon receiving a determination that the image is likely to, or believed to, include personal information. The determination may be made based at least in part on the positioning metadata. The metadata may be analyzed and deemed suspicious by a deep learning algorithm.

The method may include the step of blocking access of a remote server to the mentioned image of a physical object. The access may be blocked upon generating the alert. The access may be blocked by a processor that received the alert. The processor may be associated with the spatial computing apparatus.

The method may include the step of blocking implementation of an anchoring instruction. The implementation may be blocked upon generating the alert. The implementation may be blocked by a processor that received the alert. The processor may be associated with the spatial computing apparatus.

The method may include the step of disabling the hyperlink associated with the virtual object. The hyperlink may be disabled upon generating the alert. The hyperlink may be disabled by a processor that received the alert. The processor may be associated with the spatial computing apparatus.

The method may include the step of terminating the spatial computing session. The session may be terminated upon generating the alert. The session may be terminated by a processor that received the alert. The processor may be associated with the spatial computing apparatus.

In some embodiments of the herein-described methods and systems, when the first computer processor receives the alert, the first computer processor is configured to block access of a remote server to an image of a physical object. In some embodiments, the physical object is the mentioned first and/or second physical object.

In some embodiments, the mentioned monitoring step may be performed using a deep learning image analysis algorithm. The term "deep learning image analysis algorithm" may refer to an algorithm that utilizes deep learning to analyze unstructured image data.

In some embodiments, the described method may include the step of monitoring meta tags associated with the hyperlink. In some embodiments, the method may include the step of terminating the spatial computing session. The session may be terminated following receipt of an indication of a suspicious meta tag. The indication may be received by a processor. The processor may be associated with the spatial computing apparatus.

Anchoring algorithms are known in the art. Exemplary algorithms include visual-inertial odometry. In some embodiments, visual-inertial odometry combines information from a device's motion sensing hardware with computer vision analysis of the scene viewed by the device's camera. The algorithm may recognize notable features in the scene image, track differences in the positions of those features across video frames, and compare the resulting information with motion sensing data. This algorithm may create a high-precision model of the device's position and motion. An example is commercially available from Apple® under the trademark ARKit®. visual-inertial odometry may include a planeDetection feature, which may activate detection, positioning, and sizing of flat surfaces in a camera image.

Additional anchoring algorithms include world tracking. World tracking may analyze and interpret the contents of a local environment. Additional anchoring algorithms include Raycasting and Hit-Testing, which may identify real-world surfaces corresponding to a point in a camera image and interaction of same with virtual content. An example is commercially available under the trademark WebXR, which may be available from W3C® World Wide Web Consortium 3).

The aforementioned computer processor may be a computer, as described in more detail in FIG. 1, optionally including any of the components and elements described for FIG. 1.

Figure 2:
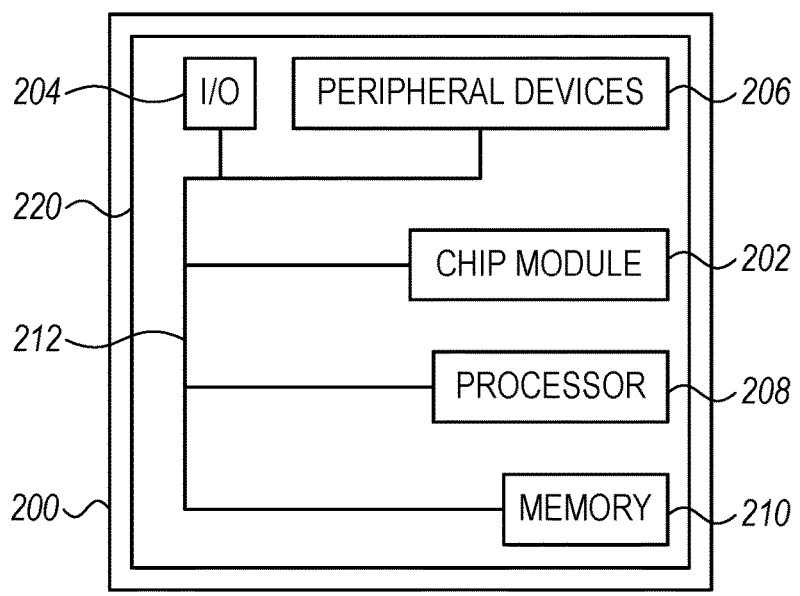
FIG. 2 shows an illustrative system in accordance with the principles of the described embodiments.

In some aspects, the computer processor may be a computer, as described in more detail in FIG. 2, optionally including any of the components and elements described for FIG. 2.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

One or more of the described spatial computing systems may comprise one or more computer systems and servers that include one or more of the following hardware components: Computer 101 may have a processor 103 for controlling the operation of the device and its associated components, and may include random-access memory (RAM) 105, read-only memory (ROM) 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may monitor metadata from anchoring instructions and generate an alert when a suspicious characteristic is detected. The computer executable instructions may be embodied in hardware or firmware (not shown). The computer 101 may execute the instructions embodied by the application program(s) 119 to perform various functions, such as monitoring anchored virtual objects and hyperlinks associated with same, and using ML algorithms to detect suspicious activity.

Application program(s) 119 may utilize the computer-executable instructions executed by a processor for example for monitoring anchoring instructions and images associated with such instructions. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered engines for the purposes of this application and with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices.

Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the described embodiments. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
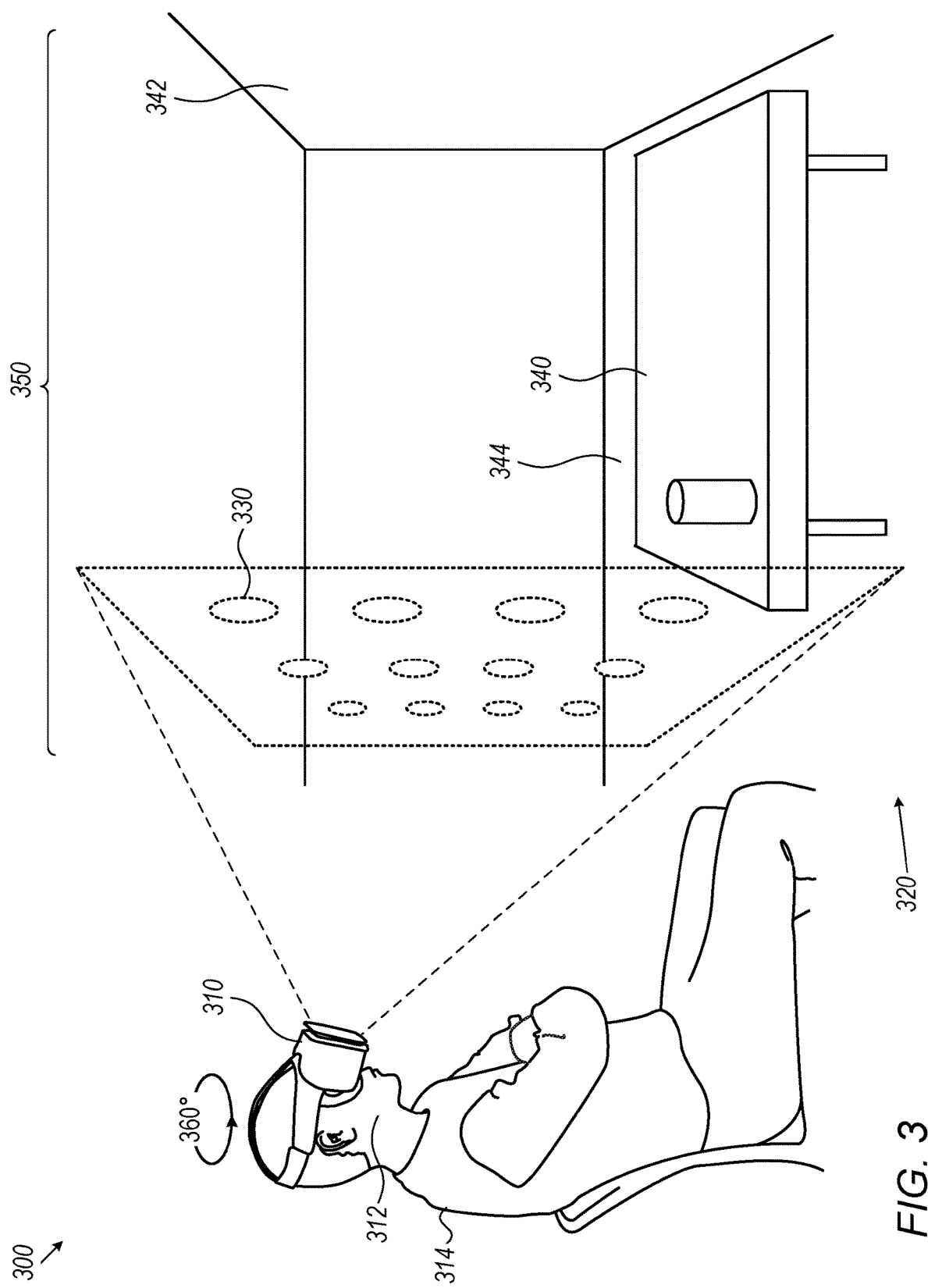
FIG. 3 shows an overview 300 of a spatial computing device 310 and interface.

FIG. 3 shows an overview 300 of spatial computing device 310 and interface 320. Spatial computing device 310 can be worn on face 312 of user 314 and can panoramically scan and/or monitor environment 350. Via spatial computing interface 320, virtual objects 330 can be anchored to physical objects, such as a table 340, wall 342, or floor 344.

Figure 4:
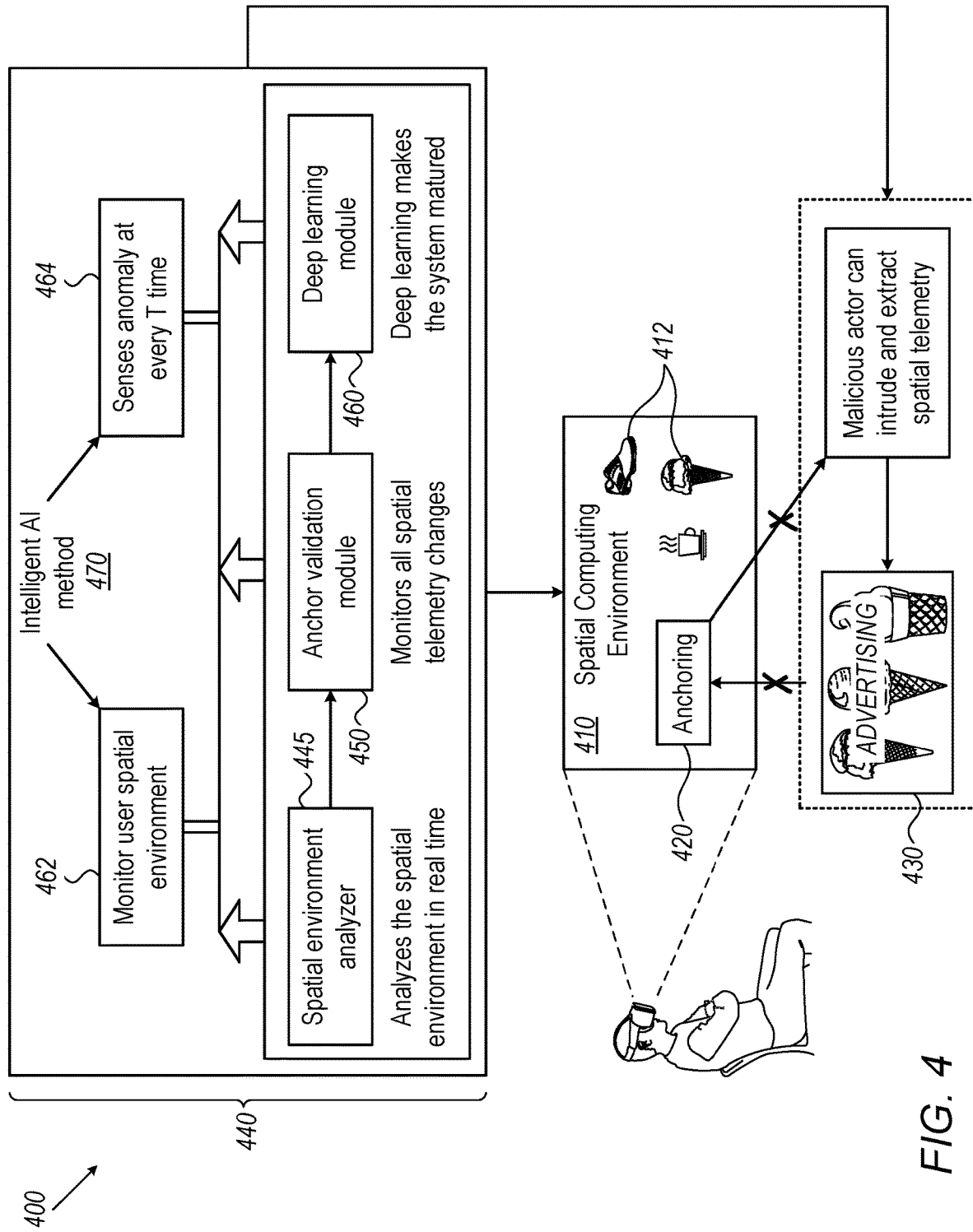
FIG. 4 shows an exemplary data flow diagram of a spatial computing system.

FIG. 4 shows an exemplary data flow diagram of a spatial computing system 400. Physical objects 412 in spatial computing environment 410 may be localized by a sensor (not shown) and used in an anchoring instruction or command 420. A malicious actor 430 can intrude upon or hack the anchoring instruction 420 or anchoring layer.

With further reference to FIG. 4, a spatial computing security system 440 may include spatial environment analyzer module 445, which may scan and/or monitor the spatial computing environment substantially in real time and detect abnormalities in an anchor component and/or its spatial environment. Abnormalities may include an altered display of virtual objects or hyperlinks associated with the virtual objects; and anchoring to physical objects containing personal information. An aberrant or anomalous hyperlink may redirect the spatial computing system, or a browser associated therewith, to a malicious website.

With further reference to FIG. 4, security system 440 may include anchor validation module 450, which may provide validation services for anchor instructions. Anchor validation module 450 may be configured to halt an anchoring instruction before anchor deployment. Anchor validation module 450 may sense the activities of an external actor such as malicious actor 430. Anchor validation module 450 may transmit or stream data to deep learning module 460.

With further reference to FIG. 4, security system 440 may include deep learning module 460. This module may train itself to discover patterns associated with abnormal and/or suspicious anchoring instructions, virtual object displays, and hyperlinks associated with virtual objects. Deep learning module 460 may detect suspicious aspects of the spatial computing environment and generate an alert substantially in real time. Deep learning module 460 may identify or detect an anomaly in an anchoring instruction or an associated hyperlink. Spatial environment analyzer module 445, anchor validation module 450, and deep learning module 460 may cooperate to monitor user spatial environment at step 462 and/or sense, detect, or monitor for anomalies at fixed time intervals at step 464.

With further reference to FIG. 4, security system 440 may include artificial intelligence or machine learning (ML) algorithm 470, which may direct substantially real-time monitoring of the spatial computing environment and anchoring instructions. ML algorithm 470 may contain a timekeeper layer (not shown), which may direct monitoring at fixed time intervals. Algorithm 470 may correspond to deep learning module 460. In some embodiments, algorithm 470 may be a separate component from deep learning module 460.

Figure 5:
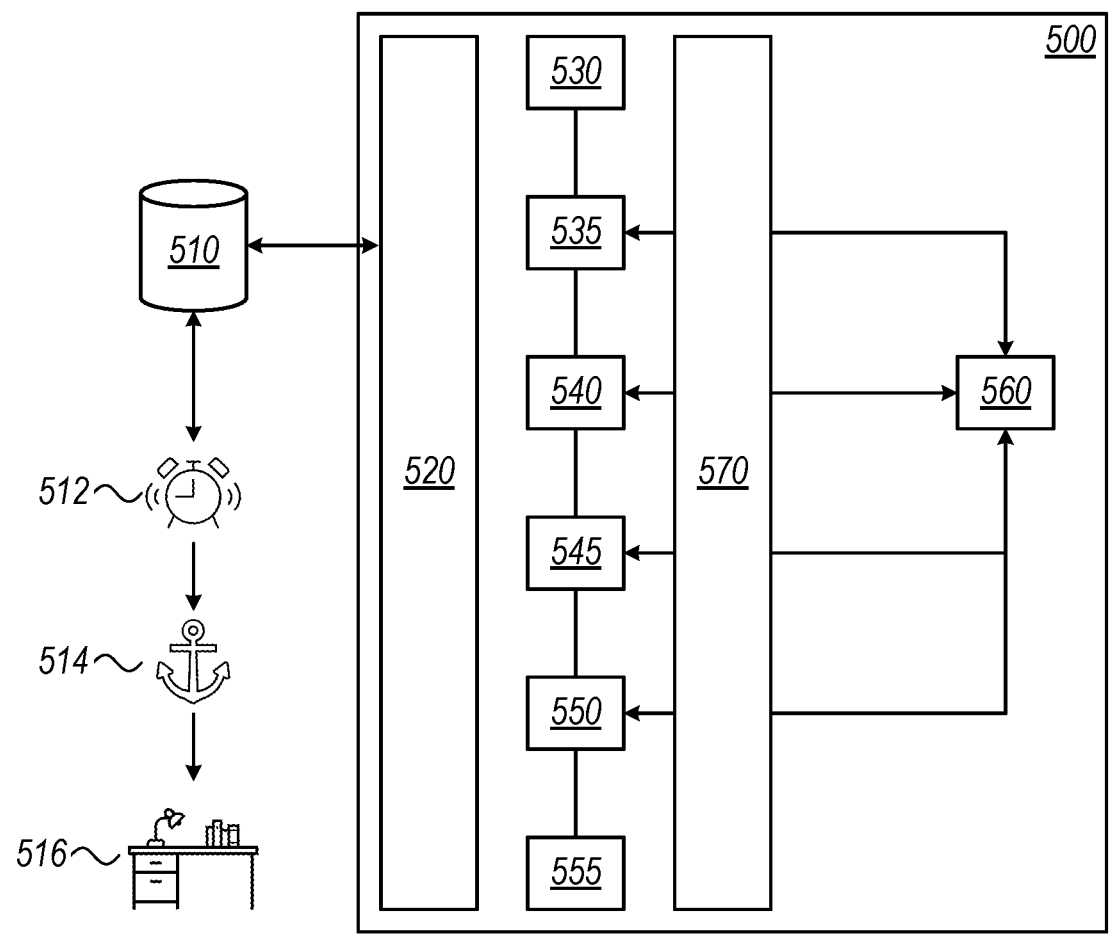
FIG. 5 shows an architecture of a spatial computing device.

FIG. 5 shows an architecture of spatial computing device 500. Event, message, or other content 510, as well as data regarding virtual object 512, anchor 514, and physical object 516, may be stored on blockchain-distributed network (BDN) 520. BDN 520 may be a private blockchain. BDN 520 may protect event, message, or other content 510 from being tampered with. BDN 520 may be housed by spatial computing system 500 (as depicted). BDN 520 may be housed externally to spatial computing system 500.

Spatial computing system 500 may include plug-in or adaptor layer 530 (also referred to herein as "onboarding module"), spatial telemetry extraction module 535, spatial analyzer module 540, anchor validation module 545, session management module 550, and spatial security rule orchestration module 555. Spatial computing system 500 may share LiDAR metadata and anchor metadata with deep learning module 560 (data flow is depicted by arrows). Deep learning module 560 may be housed by spatial computing system 500 (as depicted). Deep learning module 560 may be housed externally to spatial computing system 500. Deep learning module 560 may be housed in a cloud-based server.

Plug-in or adaptor layer 530 may be configured to interface with an existing spatial computing software platform.

Spatial telemetry extraction module 535 may be configured to extract positioning metadata associated with virtual objects.

Spatial analyzer module 540 may be configured to detect an anomaly in anchoring instructions. The anomaly may indicate a suspected attempt to glean personal information from the image of a physical object.

LiDAR metadata and anchor metadata may pass through homomorphic encryption layer 570. Homomorphic encryption layer 570 may enable analysis of LiDAR metadata and anchor metadata by a service provider, without requiring decryption of the metadata. This ability may protect the privacy of a user of spatial computing system 500.

LiDAR metadata and anchor metadata may be generated by spatial telemetry extraction module 535, spatial analyzer module 540, anchor validation module 545, and/or session management module 550. Deep learning module 560 may provide feedback on anchor metadata to spatial telemetry extraction module 535, spatial analyzer module 540, anchor validation module 545, and/or session management module 550. Deep learning module 560 may alert telemetry extraction module 535, spatial analyzer module 540, anchor validation module 545, and/or session management module 550 of suspicious anchor metadata.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, described embodiments may take the form of an entirely software embodiment (including firmware, resident software, micro-code, and the like), an entirely hardware embodiment, or an embodiment combining software and hardware aspects that may generally be referred to herein as a "system." Furthermore, described embodiments may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented, the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random-access memory (RAM), a read-only memory (ROM), an erasable programmable read-only memory (EPROM or Flash memory), a compact disc read-only memory (CD-ROM), and/or some other tangible optical and/or magnetic storage device. In other described embodiments, however, the computer-readable medium may be transitory, such as a propagation signal including computer-executable program code portions embodied therein.

It will also be understood that one or more computer-executable program code portions may be required on a specialized computer for carrying out the specialized operations, including object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#

It will further be understood that some embodiments are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out a described embodiment.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatus, and computer program products are provided for monitoring and preventing malicious anchoring by spatial computing apparatus. Persons skilled in the art will appreciate that the present invention can be practiced by other than the described embodiments, which are presented for purposes of illustration rather than of limitation.

What is claimed is:

1. A spatial computing system, the spatial computing system comprising:
    a wearable device, the wearable device comprising:
        a sensor configured to localize, with respect to a fixed landmark, a first physical object and a second physical object and capture an image of each of the first and second physical objects;
        an augmented reality screen configured to project a virtual object onto a visual field of a wearer, wherein the virtual object is associated with a hyperlink; and
        an interface configured to receive a first anchoring instruction from the wearer, the first anchoring instruction serving to fix the virtual object relative to the first physical object, wherein the first anchoring instruction is configured to be overridable by a second anchoring instruction, the second anchoring instruction serving to fix the virtual object relative to the second physical object,
    a first computer processor configured to implement the first and second anchoring instructions;
    a second computer processor configured to:
        monitor the first anchoring instruction, the second anchoring instruction, and the hyperlink;
        run a deep learning algorithm, wherein the deep learning algorithm is enabled to detect an anomaly in the first anchoring instruction, the second anchoring instruction, and the hyperlink; and
        when the anomaly is detected, transmit an alert to the first computer processor,
    wherein, when the first computer processor receives the alert, the first computer processor is configured to block implementation of the second anchoring instruction.

2. The spatial computing system of claim 1, wherein the anomaly is a second anchoring instruction anomaly.

3. The spatial computing system of claim 2, wherein the second physical object comprises confidential information.

4. The spatial computing system of claim 1, wherein the anomaly is a hyperlink anomaly.

5. The spatial computing system of claim 4, wherein the anomaly redirects to a malicious website.

6. The spatial computing system of claim 1, wherein the deep learning algorithm comprises a deep neural network, the deep neural network comprising more than three layers of nodes.

7. The spatial computing system of claim 1, wherein the spatial computing system further comprises:
    a spatial telemetry extraction module configured to extract positioning metadata associated with the first and second physical objects;
    a spatial analyzer module configured to detect an anomaly in the first and second anchoring instructions, wherein the anomaly indicates a suspected attempt to glean personal information from the image of the first or second physical object;
    an anchor validation module configured to validate the first and second anchoring instructions prior to implementing the first and second anchoring instructions, respectively;
    a session management module configured to, upon receiving an indication of the anomaly, terminate a spatial computing session; and a spatial security rule orchestration module configured to block implementation of the first and second anchoring instructions.

8. The spatial computing system of claim 7, wherein the spatial computing system further comprises a deep learning module configured to detect a positioning metadata anomaly and a suspicious aspect of the first and second anchoring instructions.

9. The spatial computing system of claim 8, wherein the deep learning module operates from a cloud server.

10. The spatial computing system of claim 9, wherein a homomorphic encryption layer mediates between the spatial computing system and the cloud server.

11. The spatial computing system of claim 7, wherein the spatial computing system further comprises a telemetry sensor configured to detect a position of the wearer.

12. The spatial computing system of claim 7, wherein the spatial computing system further comprises an onboarding module comprising a plug-in, the plug-in being configured to interface with an existing spatial computing software platform.

13. A spatial computing system, the spatial computing system comprising:
   a wearable device, the wearable device comprising:
      a sensor configured to localize, with respect to a fixed landmark, a first physical object and a second physical object and capture an image of each of the first and second physical objects;
      an augmented reality screen configured to project a virtual object onto a visual field of a wearer, wherein the virtual object is associated with a hyperlink; and
      an interface configured to receive a first anchoring instruction from the wearer, the first anchoring instruction serving to fix the virtual object relative to the first physical object, wherein the first anchoring instruction is configured to be overridable by a second anchoring instruction, the second anchoring instruction serving to fix the virtual object relative to the second physical object,
   a first computer processor configured to implement the first and second anchoring instructions;
   a second computer processor configured to:
      monitor the first anchoring instruction, the second anchoring instruction, and the hyperlink;
      run a deep learning algorithm, wherein the deep learning algorithm is enabled to detect an anomaly in the first anchoring instruction, the second anchoring instruction, and the hyperlink; and
      when the anomaly is detected, transmit an alert to the first computer processor,
   wherein, when the first computer processor receives the alert, the first computer processor is configured to disable the hyperlink.

14. A spatial computing system, the spatial computing system comprising:
   a wearable device, the wearable device comprising:
      a sensor configured to localize, with respect to a fixed landmark, a first physical object and a second physical object and capture an image of each of the first and second physical objects;
      an augmented reality screen configured to project a virtual object onto a visual field of a wearer, wherein the virtual object is associated with a hyperlink; and
      an interface configured to receive a first anchoring instruction from the wearer, the first anchoring instruction serving to fix the virtual object relative to the first physical object, wherein the first anchoring instruction is configured to be overridable by a second anchoring instruction, the second anchoring instruction serving to fix the virtual object relative to the second physical object,
   a first computer processor configured to implement the first and second anchoring instructions;
   a second computer processor configured to:
      monitor the first anchoring instruction, the second anchoring instruction, and the hyperlink;
      run a deep learning algorithm, wherein the deep learning algorithm is enabled to detect an anomaly in the first anchoring instruction, the second anchoring instruction, and the hyperlink; and
      when the anomaly is detected, transmit an alert to the first computer processor, wherein, when the first computer processor receives the alert, the first computer processor is configured to block access of a remote server to the image of the first or second physical object.

15. A method of protecting confidential information of a user of a spatial computing apparatus, the method utilizing a computer processor and one or more non-transitory computer-readable media storing computer executable instructions, wherein the instructions, when executed by the computer processor, automatically generate an alert, wherein the method comprises:
   generating a three-dimensional (3D) model of surroundings of a wearable device;
   localizing, with respect to a fixed landmark, a physical object in the 3D model;
   capturing an image of the physical object;
   projecting a virtual object onto a visual field of a wearer of the wearable device, wherein the virtual object is associated with a hyperlink;
   receiving an anchoring instruction from the wearer, the anchoring instruction serving to fix the virtual object relative to the physical object;
   monitoring positioning metadata associated with the virtual object;
   generating the alert upon receiving a determination that the image is likely to comprise personal information; and
   upon generating the alert, blocking access of a remote server to the image.

16. The method of claim 15, wherein the monitoring is performed using a deep learning image analysis algorithm.

17. The method of claim 16, wherein the deep learning image analysis algorithm operates from a cloud server.

18. The method of claim 17, wherein a homomorphic encryption layer mediates between the spatial computing apparatus and the cloud server.

19. The method of claim 15, the method further comprising monitoring meta tags associated with the hyperlink.

20. The method of claim 19, the method further comprising, upon receiving an indication of a suspicious meta tag, terminating a spatial computing session.

* * * * *